(12) United States Patent
Tanaka et al.

(10) Patent No.: US 8,046,131 B2
(45) Date of Patent: Oct. 25, 2011

(54) VEHICULAR STEERING APPARATUS

(75) Inventors: Hideyuki Tanaka, Tokyo (JP); Takanori Matsunaga, Tokyo (JP); Masahiko Kurishige, Tokyo (JP); Takayuki Kifuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 381 days.

(21) Appl. No.: 11/591,608

(22) Filed: Nov. 2, 2006

(65) Prior Publication Data

US 2008/0189014 A1 Aug. 7, 2008

(30) Foreign Application Priority Data

Nov. 2, 2005 (JP) .................................. 2005-319760

(51) Int. Cl.
*B62D 5/04* (2006.01)
(52) U.S. Cl. ......................................... 701/41; 180/446
(58) Field of Classification Search .............. 701/41–43; 180/443, 446
See application file for complete search history.

(56) References Cited

U.S. PATENT DOCUMENTS

| | | | | |
|---|---|---|---|---|
| 4,681,181 | A | * | 7/1987 | Shimizu ........................ 180/446 |
| 4,880,072 | A | * | 11/1989 | Sakamoto et al. ............ 180/415 |
| 6,450,287 | B1 | * | 9/2002 | Kurishige et al. ............. 180/446 |
| 6,941,213 | B2 | * | 9/2005 | Yasui et al. ........................ 701/80 |
| 2002/0125063 | A1 | * | 9/2002 | Kurishige et al. ............. 180/443 |
| 2004/0079578 | A1 | * | 4/2004 | Kurishige et al. ............. 180/446 |
| 2004/0084241 | A1 | * | 5/2004 | Niessen et al. ................ 180/446 |
| 2004/0133324 | A1 | * | 7/2004 | Yasui et al. ........................ 701/41 |
| 2005/0067213 | A1 | * | 3/2005 | Yasui et al. ..................... 180/443 |

FOREIGN PATENT DOCUMENTS

| | | |
|---|---|---|
| DE | 36-26597 C2 | 2/1987 |
| DE | 36-27107 C2 | 2/1987 |
| DE | 101-15018 A1 | 11/2002 |
| DE | 103-25587 A1 | 1/2004 |
| DE | 102-01704 B4 | 9/2005 |
| EP | 1-077171 A2 | 2/2001 |
| JP | 62-034850 A | 2/1987 |
| JP | 6-144280 A | 5/1994 |
| JP | 06-144280 A | 5/1994 |
| JP | 07-186983 | 7/1995 |
| JP | 2001-122146 A | 5/2001 |
| JP | 2001-233231 | 8/2001 |
| JP | 2002-211427 | 7/2002 |
| JP | 2002-308131 A | 10/2002 |
| JP | 2002-2308131 A | 10/2002 |
| JP | 2003-072577 | 3/2003 |
| JP | 2003-312521 | 11/2003 |
| JP | 2005-112044 | 4/2005 |
| WO | 2004/101346 A1 | 11/2004 |

\* cited by examiner

*Primary Examiner* — Mark Hellner
*Assistant Examiner* — Ari M Diacou
(74) *Attorney, Agent, or Firm* — Sughrue Mion, PLLC

(57) ABSTRACT

Provided is a vehicular steering apparatus capable of improving a steering feeling and achieving a reduction in cost. The vehicular steering apparatus according to the present invention is equipped with an assist motor for generating an assist torque, a state quantity detector for detecting a steering shaft reaction torque and a road surface reaction torque, and a control unit for calculating a target current value of the assist motor. The control unit includes a friction compensation portion and a return compensation portion, which calculate a friction compensation torque for compensating for the assist torque and a return compensation torque for compensating for the assist torque from the steering shaft reaction torque and the road surface reaction torque respectively. The control unit compensates for an overall friction torque in a steering mechanism and a gradient of the road surface reaction torque, using the friction compensation torque and the return compensation torque.

15 Claims, 13 Drawing Sheets

FIG. 5

| OVERALL FRICTION TORQUE | GRADIENT OF ROAD SURFACE REACTION TORQUE | | |
|---|---|---|---|
| | SMALLER THAN IDEAL VALUE | IDEAL VALUE | LARGER THAN IDEAL VALUE |
| IDEAL VALUE | k2>k1<br>ret_lim>fric_Lim | | k1>k2<br>fric_lim≧ret_Lim |
| LARGER THAN IDEAL VALUE | k2>k1<br>ret_lim≧fric_Lim | k1=k2<br>fric_lim≧ret_Lim | k1>k2<br>fric_lim≧ret_Lim |

VEHICULAR STEERING APPARATUS

BACKGROUND OF THE INVENTION

1. Field of the Invention

The present invention relates to a vehicular steering apparatus for generating, by using a motor, an assist torque for supplementing a steering torque exerted by a driver.

2. Description of the Related Art

In general, a driver steers in turning at a curved section of a road or at an intersection, and then returns a steering wheel with the aid of a spontaneous returning force of the steering wheel, which corresponds to a road surface reaction torque received by tires from a road surface, in starting to travel straight again. However, the road surface reaction torque is small when an overall friction torque generated in an entire steering mechanism of a vehicle is large, or when the vehicle travels on a slippery road surface such as a frostbound road. In such the cases, the road surface reaction torque is equal to or smaller than the overall friction torque of the steering mechanism, so the steering wheel may not return in starting to travel straight again.

In such the cases, accordingly, the driver is required to apply a torque to the steering wheel to return the steering wheel to a neutral point. As a result, there is caused a problem of a deterioration in steering feeling.

In consideration of the aforementioned problem, a conventional motorized power steering control apparatus has a road surface reaction torque detecting means for detecting a road surface reaction torque received by tires from a road surface, and a road surface reaction torque application control means for controlling a torque of a motor for supplementing a steering torque exerted by a driver based on the road surface reaction torque detected by the road surface reaction torque detecting means (e.g., see JP 2001-122146 A).

Another conventional motorized power steering apparatus is equipped with a steering torque detecting means for detecting a steering torque of a steering system, a steering rotation detecting means for detecting a rotational speed of the steering system, a motor control signal generating means for determining a motor control signal based on respective detection signals from the steering torque detecting means and the steering rotation detecting means and outputting the motor control signal, and a motor driving means for driving a motor of a steering force amplifying device based on the motor control signal from the motor control signal generating means.

The motor control signal generating means is equipped with a road surface load-corresponding control signal determining means for determining a control signal corresponding to a road surface load based on a detection signal of the steering torque detecting means, a friction-corresponding control signal determining means for determining a control signal corresponding to a friction of a system of the steering force amplifying device based on the detection signal of the steering torque detecting means, and a calculation means for adding both control signals of both the determining means together and outputting an added result as a motor torque control signal (e.g., see JP 62-34850 A).

Still another conventional motorized power steering apparatus is equipped with a steering assist motor coupled to a steering system to generate a steering assist torque, a steering torque detecting means for detecting a steering torque of the steering system, a vehicle speed detecting means for detecting a vehicle speed, and a control means for creating an assist command based on outputs of the steering torque detecting means and the vehicle speed detecting means and controlling the driving of the motor through the assist command.

The control means has a friction compensation means for calculating a friction compensation value based on a rotational direction of the motor. The control means controls the driving of the motor through a command signal, which is obtained by adding the friction compensation value to the assist command (e.g., see JP 06-144280 A).

A conventional vehicular power steering apparatus has an actuator for generating an assist steering torque, a means for detecting a steering torque, a control means for controlling the assist steering torque of the actuator by an assist steering control amount based on at least the steering torque, a means for detecting a lateral acceleration of a vehicle, and a means for calculating a hysteresis width of a Lissajous waveform of the steering torque with respect to the lateral acceleration of the vehicle. The control means corrects the assist steering control amount based on the hysteresis width (e.g., see JP 2002-308131 A).

In the conventional motorized power steering control apparatus disclosed in the document of JP 2001-122146 A, although a pseudo-feeling of a road surface reaction force can be aroused in the driver, the overall friction torque (i.e., hysteresis width) generated in the entire steering mechanism cannot be compensated for. As a result, there is a problem in that a steering feeling cannot be improved.

In the conventional motorized power steering apparatuses disclosed in the documents of JP 62-34850 A and JP 06-144280 A, it is possible to compensate for the overall friction torque. However, it is impossible to compensate for the overall friction torque when the steering torque is 0, or when the speed of the motor is 0. Therefore, there is a problem in that a steering feeling cannot be improved in accordance with a driving state.

In the conventional vehicular power steering apparatus disclosed in the document of JP 2002-308131 A, the hysteresis width of the steering torque for the lateral acceleration of the vehicle is calculated, so a stable steering feeling can be ensured regardless of the aging of the steering mechanism. However, there is a problem in that this control cannot be performed under a circumstance in which a relationship between the steering torque and the lateral acceleration cannot be uniquely determined as in the case of a cant road or the like.

Further, the means for detecting the lateral acceleration is required, so there is also a problem of high cost.

SUMMARY OF THE INVENTION

The present invention has been made to solve the problems mentioned above. It is therefore an object of the present invention to provide a vehicular steering apparatus capable of constantly improving a steering feeling through arousal of a feeling of a road surface reaction force in a driver and compensation for an overall friction torque and achieving a reduction in cost.

According to the present invention, a vehicular steering apparatus includes: a motor for generating an assist torque for supplementing a steering torque exerted by a driver of a vehicle; steering shaft reaction torque detecting means for detecting a steering shaft reaction torque generated on a steering shaft of the vehicle and having hysteresis characteristics; road surface reaction torque detecting means for detecting a road surface reaction torque received by wheels of the vehicle from a road surface; and target current calculating means for calculating a target current value for driving the motor, in which: the target current calculating means includes first compensation means for calculating a first compensation amount for compensating for the assist torque based on the steering shaft reaction torque, and second compensation means for calculating a second compensation amount for compensating for the assist torque based on the road surface reaction torque; and the target current calculating means calculates the target current so that compensation for an overall friction torque generated in an entire steering mechanism of the vehicle and a gradient of the road surface reaction torque is performed based on the first compensation amount and the second compensation amount.

According to the vehicular steering apparatus of the present invention, the target current calculating means calculates a target current so that compensation for an overall friction torque generated in the entire steering mechanism of the vehicle and a gradient of a road surface reaction torque is performed based on a first compensation amount for compensating for an assist torque with a steering shaft reaction torque and a second compensation amount for compensating for the assist torque with the road surface reaction torque. Therefore, a steering feeling can be constantly improved through arousal of a feeling of a road surface reaction force in a driver and compensation for the overall friction torque. Further, a reduction in cost can be achieved.

BRIEF DESCRIPTION OF THE DRAWINGS

In the accompanying drawings:

FIG. 5 is an explanatory diagram showing a relationship between gains set in a return compensation portion and a friction compensation portion, and a relationship between limiters set in the return compensation portion and the friction compensation portion;

DETAILED DESCRIPTION OF THE PREFERRED EMBODIMENTS

Respective embodiments of the present invention will be described hereinafter based on the drawings. In the respective drawings, like reference symbols are assigned to like or corresponding members and portions to describe them.

The following embodiments of the present invention will be described as to a case in which the vehicular steering apparatus according to the present invention is mounted in an automobile.

First Embodiment

Figure 1:
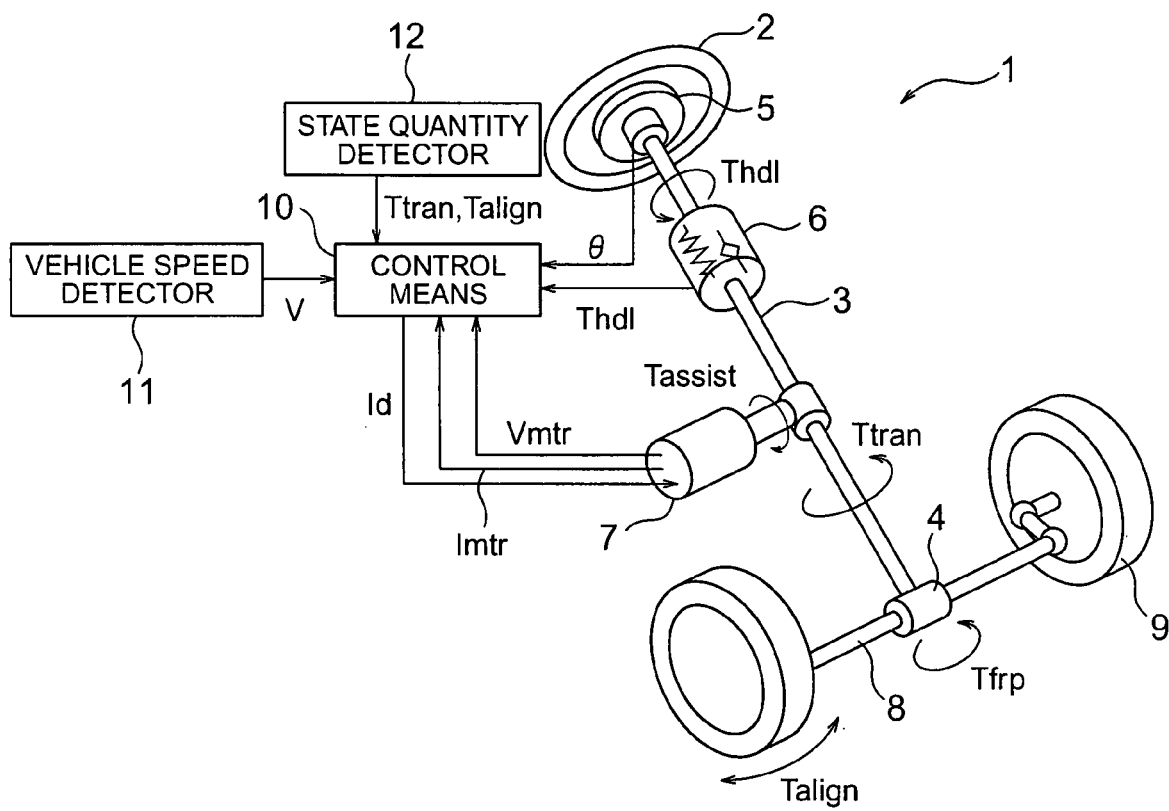
FIG. 1 is a schematic diagram showing a steering mechanism of a vehicular steering apparatus according to a first embodiment of the present invention.

FIG. 1 is a schematic diagram showing a steering mechanism 1 of a vehicular steering apparatus according to a first embodiment of the present invention.

Referring to FIG. 1, a steering mechanism 1 has a steering wheel 2, a steering shaft 3, a steering gearbox 4, a steering wheel angle detector 5 (i.e., steering wheel angle detecting means), a torque sensor 6 (i.e., steering torque detecting means), an assist motor 7 (i.e., motor), a rack-and-pinion mechanism 8, tires 9 (i.e., wheels), an electric power steering (EPS) control means 10 (i.e., target current calculating means) (hereinafter, abbreviated as "the control means 10"), a vehicle speed detector 11 (i.e., vehicle speed detecting means), and a state quantity detector 12 (i.e., steering shaft reaction torque detecting means and road surface reaction torque detecting means).

The steering wheel 2, which is steered by a driver of an automobile, is coupled to one end of the steering shaft 3. The steering wheel 2 is fitted with the steering wheel angle detector 5, which detects a steering wheel angle θ.

The steering shaft 3 is fitted with the torque sensor 6, which detects a steering torque Thdl resulting from the steering of the driver. The steering shaft 3 is also fitted with the assist motor 7, which is a motorized component for generating an assist torque Tassist for supplementing the steering torque Thdl, via a reduction gear (not shown).

The steering gearbox 4, which amplifies a synthetic torque obtained through summation of the steering torque Thdl and the assist torque Tassist, is coupled to the other end of the steering shaft 3.

The steering gearbox 4 is also fitted with the tires 9 via the rack-and-pinion mechanism 8.

The vehicle speed detector 11 detects a vehicle speed V of a vehicle. The state quantity detector 12 detects a steering shaft reaction torque Ttran generated on the steering shaft 3 and a road surface reaction torque Talign received by the tires 9 from a road surface.

The steering wheel angle θ, the steering torque Thdl, the vehicle speed V, the steering shaft reaction torque Ttran, the road surface reaction torque Talign, a motor detected current Imtr of the assist motor 7, and a motor detected voltage Vmtr of the assist motor 7 are input to the control means 10.

The control means 10 calculates a target current value for driving the assist motor 7 based on the aforementioned input values, and outputs a motor driving current Id.

It should be noted herein that the steering shaft reaction torque Ttran is obtained by adding together the road surface reaction torque Talign and an overall friction torque Tfric (not shown) as a frictional force generated in the entire steering mechanism 1. A relationship among the steering shaft reaction torque Ttran, the road surface reaction torque Talign, and the overall friction torque Tfric will be described hereinafter.

Figure 2:
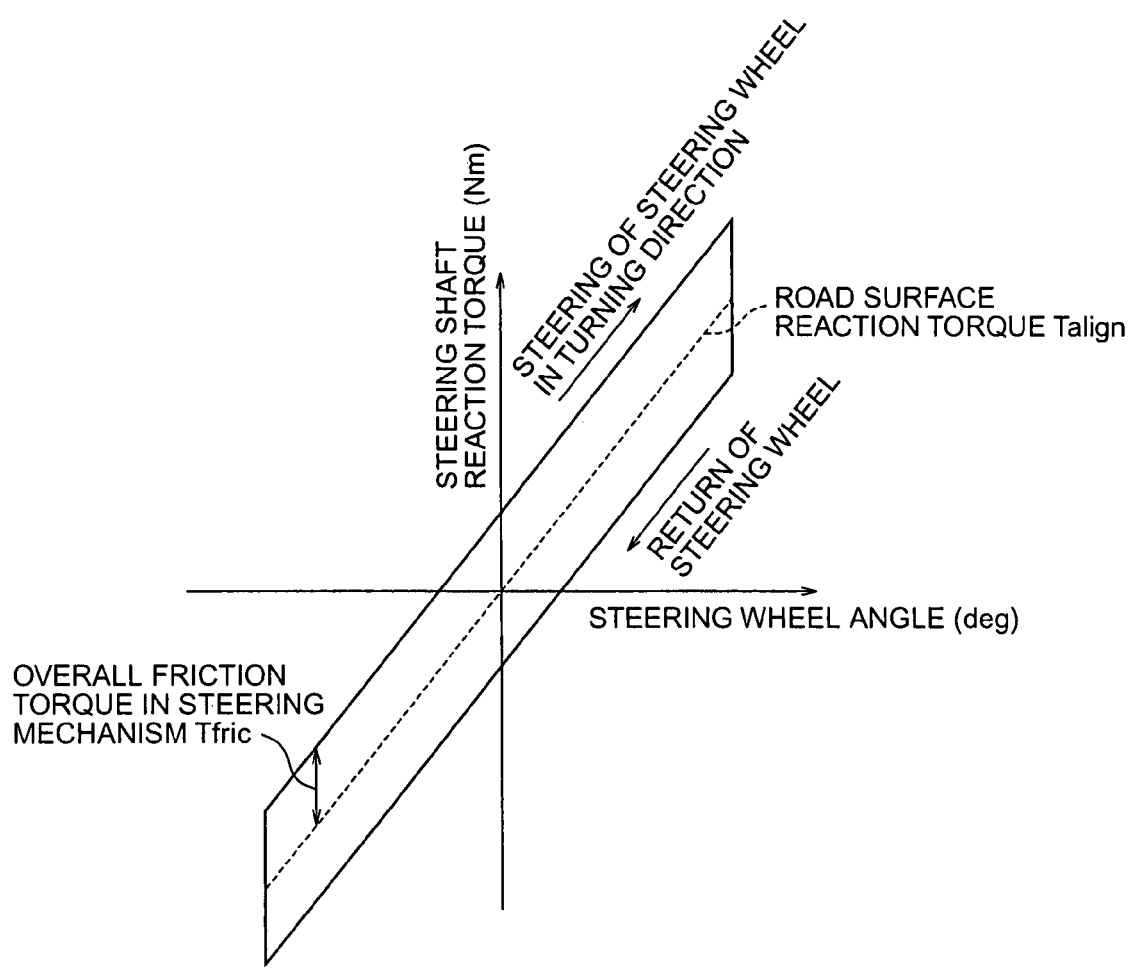
FIG. 2 is an explanatory diagram showing a general relationship between a steering wheel angle and a steering shaft reaction torque.

FIG. 2 is an explanatory diagram showing a general relationship between the steering wheel angle θ and the steering shaft reaction torque Ttran.

Referring to FIG. 2, although steering is carried out according to various patterns, the road surface reaction torque Talign changes in proportion to increases and decreases in the steering wheel angle θ. The overall friction torque Tfric, which is constant in magnitude, is reversed in sign depending on the steering direction of the steering wheel 2.

In other words, the steering shaft reaction torque Ttran is obtained by adding hysteresis characteristics corresponding to the overall friction torque Tfric to the road surface reaction torque Talign.

Accordingly, even for the same steering wheel angle θ, the steering shaft reaction torque Ttran generated on the steering shaft 3 during the steering of the steering wheel 2 increases in steering the steering wheel 2 in a turning direction, and decreases in returning the steering wheel 2.

The steering shaft reaction torque Ttran is expressed by an equation (1) shown below.

$$Ttran = Talign + Tfric \quad (1)$$

The overall friction torque Tfric is obtained by adding together a value, which is obtained by multiplying a motor friction torque Tmfric as a friction torque generated only in the assist motor 7 by a gear ratio Ggear of the reduction gear between the assist motor 7 and the steering shaft 3, and a shaft friction torque Tfrp as a friction torque generated in the steering mechanism 1 with the assist motor 7 not taken into account. A relationship between these friction torques is expressed by an equation (2) shown below.

$$Tfric = Tfrp + Ggear \cdot Tmfric \quad (2)$$

This vehicular steering apparatus mainly performs the functions of detecting, by means of the torque sensor 6, the steering torque Thdl at the time when the driver steers the steering wheel 2, and generating the assist torque Tassist in accordance with the steering torque Thdl.

From a mechanical point of view, the sum of the steering torque Thdl and the assist torque Tassist rotates the steering shaft 3 against the steering shaft reaction torque Ttran. In steering the steering wheel 2, an inertia torque generated as a result of the inertia of the assist motor 7 acts as well. Thus, given that J·dω/dt represents the inertia torque of the assist motor 7, the steering shaft reaction torque Ttran is expressed by an equation (3) shown below.

$$Ttran = Thdl + Tassist - J \cdot d\omega/dt \quad (3)$$

Given that Kt represents a torque constant of the assist motor 7, the assist torque Tassist generated by the assist motor 7 is expressed by an equation (4) shown below.

$$Tassist = Ggear \cdot Kt \cdot Imtr \quad (4)$$

The steering shaft reaction torque Ttran is also expressed by an equation (5) shown below by transforming the equation (1) using the equation (2).

$$Ttran = Talign + (Ggear \cdot Tmfric + Tfrp) \quad (5)$$

The control means 10 calculates a target current value to be supplied to the assist motor 7 based on the aforementioned respective input values, performs current control such that the target current value coincides with the motor detected current Imtr, and outputs the motor driving current Id.

As indicated by the equation (4), the assist motor 7 generates the assist torque Tassist, which is obtained by multiplying the motor detected current Imtr by the torque constant Kt and the gear ratio Ggear of the reduction gear, thereby supplementing the steering torque Thdl exerted by the driver during steering.

Figure 3:
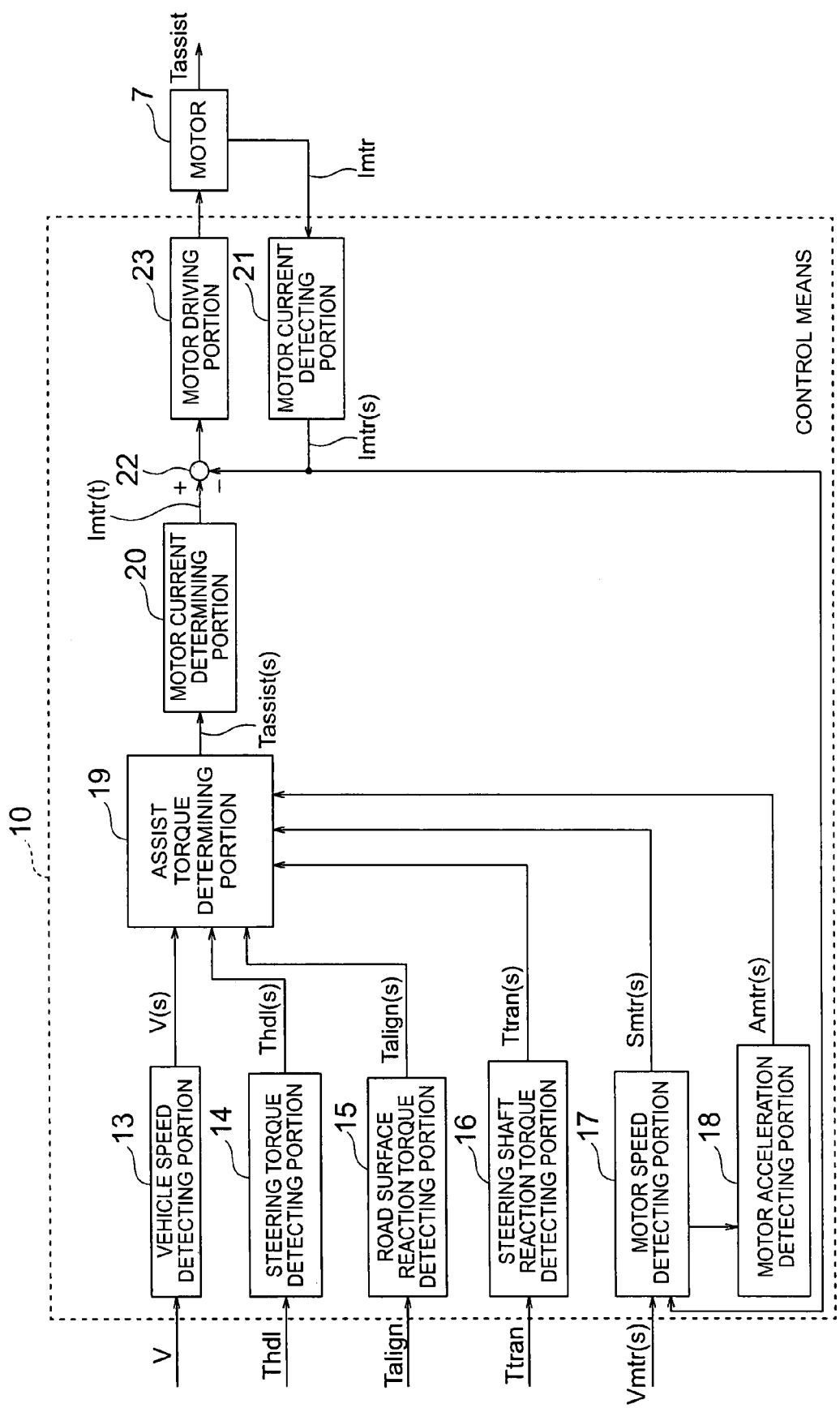
FIG. 3 is a block diagram showing a control means and an assist motor of FIG. 1.

FIG. 3 is a block diagram showing the control means 10 and the assist motor 7 of FIG. 1.

Referring to FIG. 3, the control means 10 has a vehicle speed detecting portion 13, a steering torque detecting portion 14, a road surface reaction torque detecting portion 15, a steering shaft reaction torque detecting portion 16, a motor speed detecting portion 17, a motor acceleration detecting portion 18, an assist torque determining portion 19, a motor current determining portion 20, a motor current detecting portion 21, a comparator 22, and a motor driving portion 23.

The control means 10 is designed as a microprocessor (not shown) having a CPU and a memory in which programs are stored. Respective blocks constituting the control means 10 are stored in the memory as software.

The vehicle speed detecting portion 13 receives a vehicle speed V output by the vehicle speed detector 11, and outputs a vehicle speed signal V(s). The steering torque detecting portion 14 receives the steering torque Thdl output by the torque sensor 6, and outputs a steering torque signal Thdl(s).

The road surface reaction torque detecting portion 15 receives the road surface reaction torque Talign output by the state quantity detector 12, and outputs a road surface reaction torque signal Talign(s). The steering shaft reaction torque detecting portion 16 receives the steering shaft reaction torque Ttran output by the state quantity detector 12, and outputs a steering shaft reaction torque signal Ttran(s).

The state quantity detector 12 for detecting the road surface reaction torque Talign and the steering shaft reaction torque Ttran is designed as, for example, a load cell (not shown) fitted to the tires 9 and the steering shaft 3, and outputs deformation of a strain gage provided on the load cell as the road surface reaction torque Talign and the steering shaft reaction torque Ttran.

The motor speed detecting portion 17 outputs a motor speed signal Smtr(s) based on a motor detected current signal Imtr(s) output by the motor current detecting portion 21 and a motor detected voltage signal Vmtr(s) output by a motor voltage detecting portion (not shown).

The motor acceleration detecting portion 18 differentiates the motor speed signal Smtr(s), and outputs a motor acceleration signal Amtr(s).

The vehicle speed signal V(s), the steering torque signal Thdl(s), the road surface reaction torque signal Talign(s), the steering shaft reaction torque signal Ttran(s), the motor speed signal Smtr(s), and the motor acceleration signal Amtr(s) are input to the assist torque determining portion 19.

The assist torque determining portion 19 outputs an assist torque signal Tassist(s) for causing the assist motor 7 to generate the assist torque Tassist, based on the aforementioned input values.

The motor current determining portion 20 outputs the target current value Imtr(t) for causing the assist motor 7 to generate the assist torque Tassist, based on the assist torque signal Tassist (s).

The motor current detecting portion 21 receives the motor detected current Imtr flowing through the assist motor 7, and outputs the motor detected current signal Imtr(s). The comparator 22 outputs a difference between the target current value Imtr(t) and the motor detected current signal Imtr(s). The motor driving portion 23 outputs the motor driving current Id such that the difference between the target current value Imtr(t) and the motor detected current signal Imtr(s) becomes 0.

Figure 4:
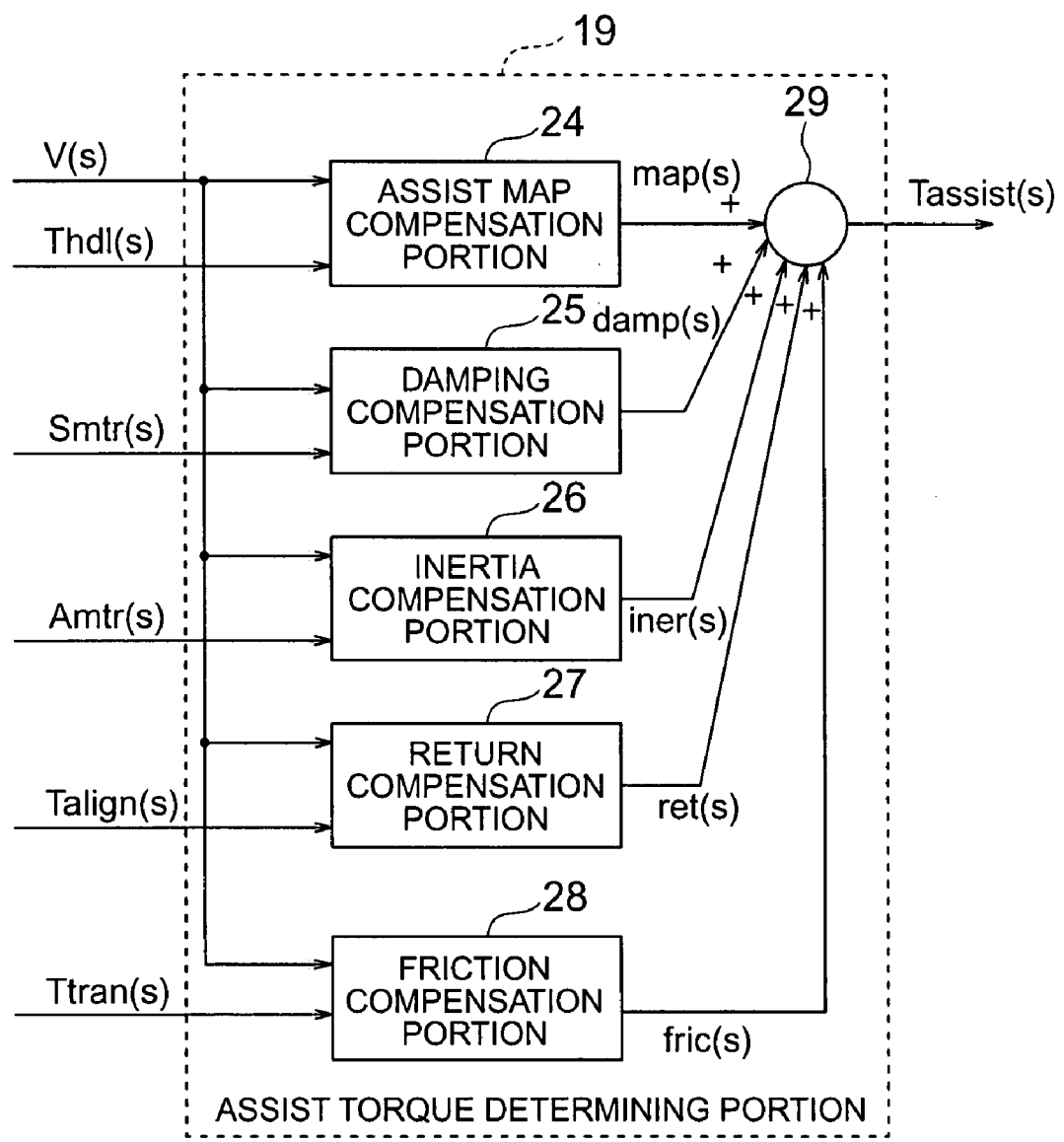
FIG. 4 is a block diagram showing an assist torque determining portion of FIG. 3 in detail.

FIG. 4 is a block diagram showing the assist torque determining portion 19 of FIG. 3 in detail.

Referring to FIG. 4, the assist torque determining portion 19 has an assist map compensation portion 24, a damping compensation portion 25, an inertia compensation portion 26, a return compensation portion 27 (i.e., second compensation means), a friction compensation portion 28 (i.e., first compensation means), and an adder 29.

The assist map compensation portion 24 outputs an assist map compensation torque map(s) based on the vehicle speed signal V(s) output by the vehicle speed detecting portion 13 and the steering torque signal Thdl(s) output by the steering torque detecting portion 14.

The damping compensation portion 25 outputs a damping compensation amount torque damp(s) based on the vehicle speed signal V(s) output by the vehicle speed detecting portion 13 and the motor speed signal Smtr(s) output by the motor speed detecting portion 17.

The inertia compensation portion 26 outputs an inertia compensation torque iner(s) based on the vehicle speed signal V(s) output by the vehicle speed detecting portion 13 and the motor acceleration signal Amtr(s) output by the motor acceleration detecting portion 18.

The return compensation portion 27 outputs a return compensation torque ret(s) (i.e., second compensation amount), which acts oppositely to a steering direction of the driver, based on the vehicle speed signal V(s) output by the vehicle speed detecting portion 13 and the road surface reaction torque signal Talign(s) output by the road surface reaction torque detecting portion 15.

The friction compensation portion 28 outputs a friction compensation torque fric(s) (i.e., first compensation amount), which acts in the steering direction of the driver, based on the vehicle speed signal V(s) output by the vehicle speed detecting portion 13 and the steering shaft reaction torque signal Ttran(s) output by the steering shaft reaction torque detecting portion 16.

The assist map compensation torque map(s), the damping compensation amount torque damp(s), the inertia compensation torque iner(s), the return compensation torque ret(s), and the friction compensation torque fric(s) are input to the adder 29. The adder 29 adds the aforementioned input values together and outputs the assist torque signal Tassist(s).

A gain k2 for amplifying an input signal and a limiter ret_lim for limiting a maximum of a control amount are set in the return compensation portion 27. A gain k1 for amplifying an input signal and a limiter fric_lim for limiting a maximum of a control amount are set in the friction compensation portion 28. FIG. 5 shows a relationship between the gains k2 and k1, and a relationship between the limiters ret_lim and fric_lim. The gains k1 and k2, and the limiters ret_lim and fric_lim are variably set according to the type of the vehicle.

An ideal value of the gradient of the road surface reaction torque Talign or the overall friction torque Tfric shown in FIG. 5 differs depending on the type of the vehicle and thus is difficult to define uniquely. FIG. 5 is therefore assumed to represent a setting method corresponding to an ideal gradient of the road surface reaction torque Talign or an ideal value of the overall friction torque Tfric, which is required according to the type of the vehicle.

An equation (6) shown below is obtained from the equations (1) and (3). In the equation (6), the influence of the inertia torque shown in the equation (1) can be regarded as 0 at a normal steering speed, so the inertia term $J \cdot 107 / dt$ is omitted.

$$Thdl + Tassist = Talign + Tfric \quad (6)$$

The steering torque Thdl and the assist torque Tassist are expressed respectively by equations (7) and (8) shown below.

$$Thdl = (1 + k2 - k1)Talign + (1 - k1)Tfric \quad (7)$$

$$Tassist = k1(Talign + Tfric) - k2 Talign \quad (8)$$

Figure 6:
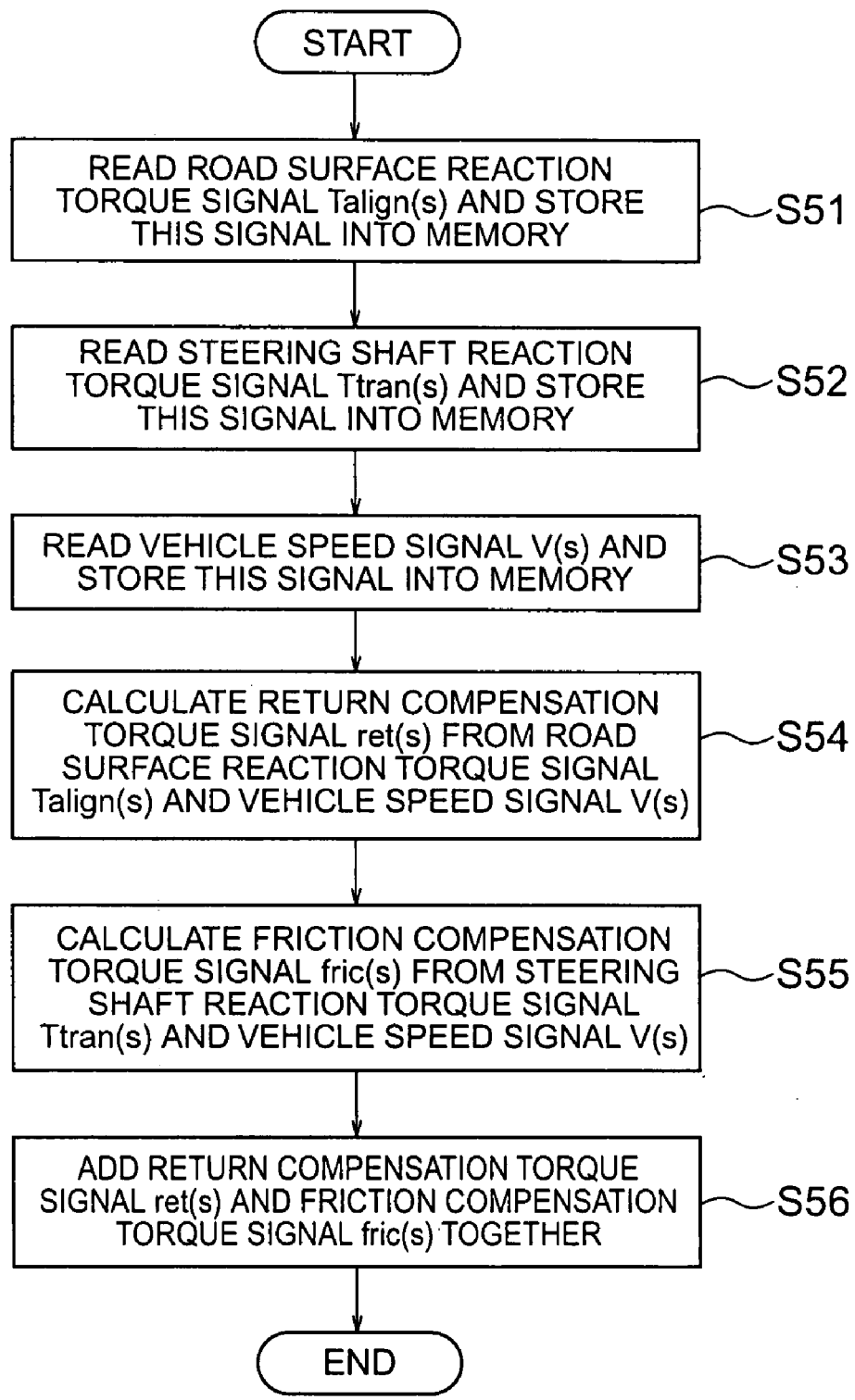
FIG. 6 is a flowchart showing an operation of the vehicular steering apparatus shown in FIG. 1.

An operation of the vehicular steering apparatus constructed as described above will be described with reference to a flowchart of FIG. 6.

The first embodiment of the present invention is characterized in that the gradient of the road surface reaction torque Talign and the overall friction torque Tfric generated in the steering mechanism 1 are compensated for based on the return compensation torque ret(s) output by the return compensation portion 27 and the friction compensation torque fric(s) output by the friction compensation portion 28.

In the actual vehicular steering apparatus, therefore, various kinds of compensation control are performed by using the assist map compensation torque map(s), the damping compensation amount torque damp(s), and the inertia compensation torque iner(s). For the sake of simplicity, however, the operations of only the friction compensation portion 28 and the return compensation portion 27 will be described hereinafter with the outputs of the assist map compensation portion 24, the damping compensation portion 25, and the inertia compensation portion 26 all fixed to 0.

First of all, the road surface reaction torque signal Talign(s) output by the road surface reaction torque detecting portion 15 is read and stored into the memory of the control means 10 (step S51).

The steering shaft reaction torque signal Ttran(s) output by the steering shaft reaction torque detecting portion 16 is read and stored into the memory (step S52).

Subsequently, the vehicle speed signal V(s) output by the vehicle speed detecting portion 13 is read and stored into the memory (step S53).

Then, the return compensation portion 27 calculates the return compensation torque ret(s) based on the road surface reaction torque signal Talign(s) and the vehicle speed signal V(s) (step S54).

Figure 7:
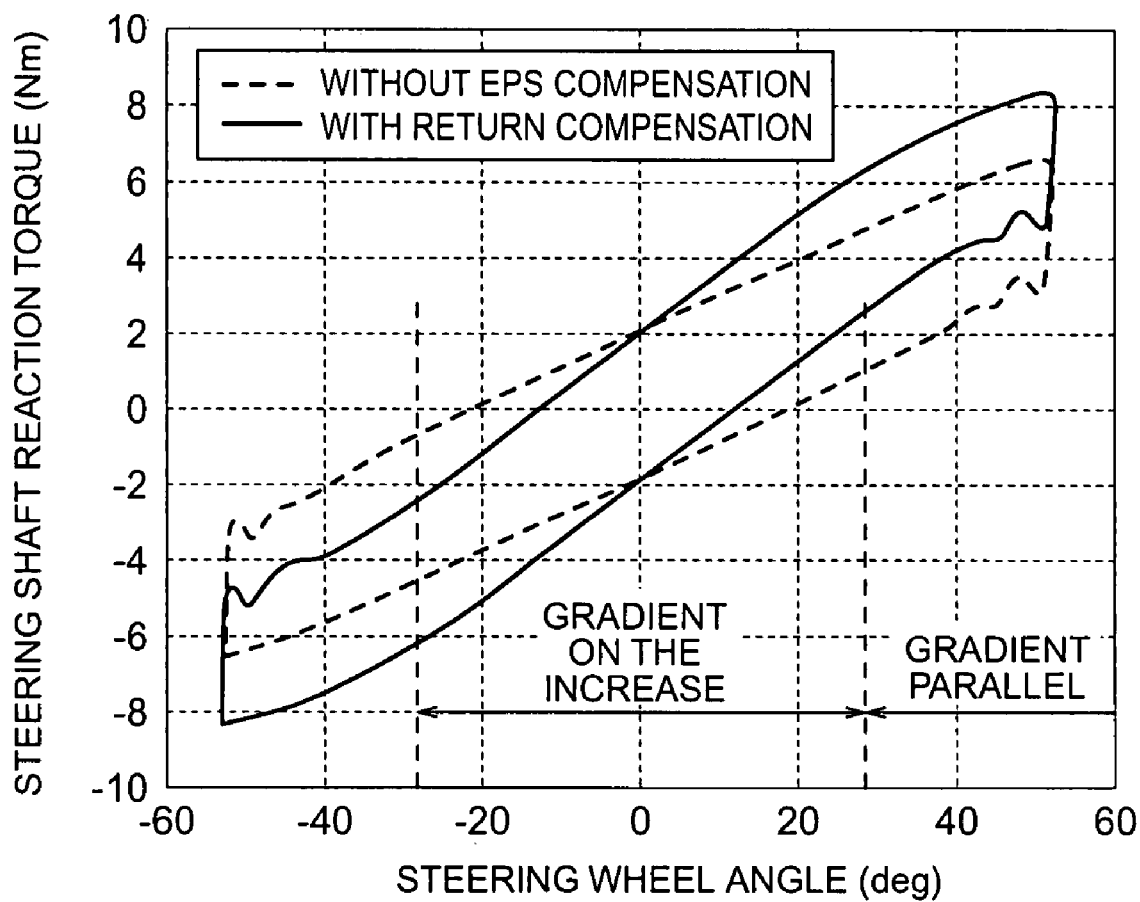
FIG. 7 is an explanatory diagram showing an effect resulting from a return compensation torque shown in FIG. 4.

FIG. 7 is an explanatory diagram showing an effect resulting from the return compensation torque ret(s). FIG. 7 illustrates Lissajous waveforms of the steering wheel angle θ and the steering shaft reaction torque Ttran in a case where the steering shaft reaction torque Ttran is compensated for only with the return compensation torque ret(s).

Referring to FIG. 7, the gain k2 and the limiter ret_lim are set in the return compensation portion 27, so the gradient of the road surface reaction torque Talign with respect to the steering wheel angle θ is increased to increase the steering shaft reaction torque Ttran. After the steering shaft reaction torque Ttran has reached a limiter value, the gradient of the road surface reaction torque Talign can be held parallel to the gradient of no compensation.

The friction compensation portion 28 calculates the friction compensation torque fric(s) based on the steering shaft reaction torque signal Ttran(s) and the vehicle speed signal V(s) (step S55).

Figure 8:
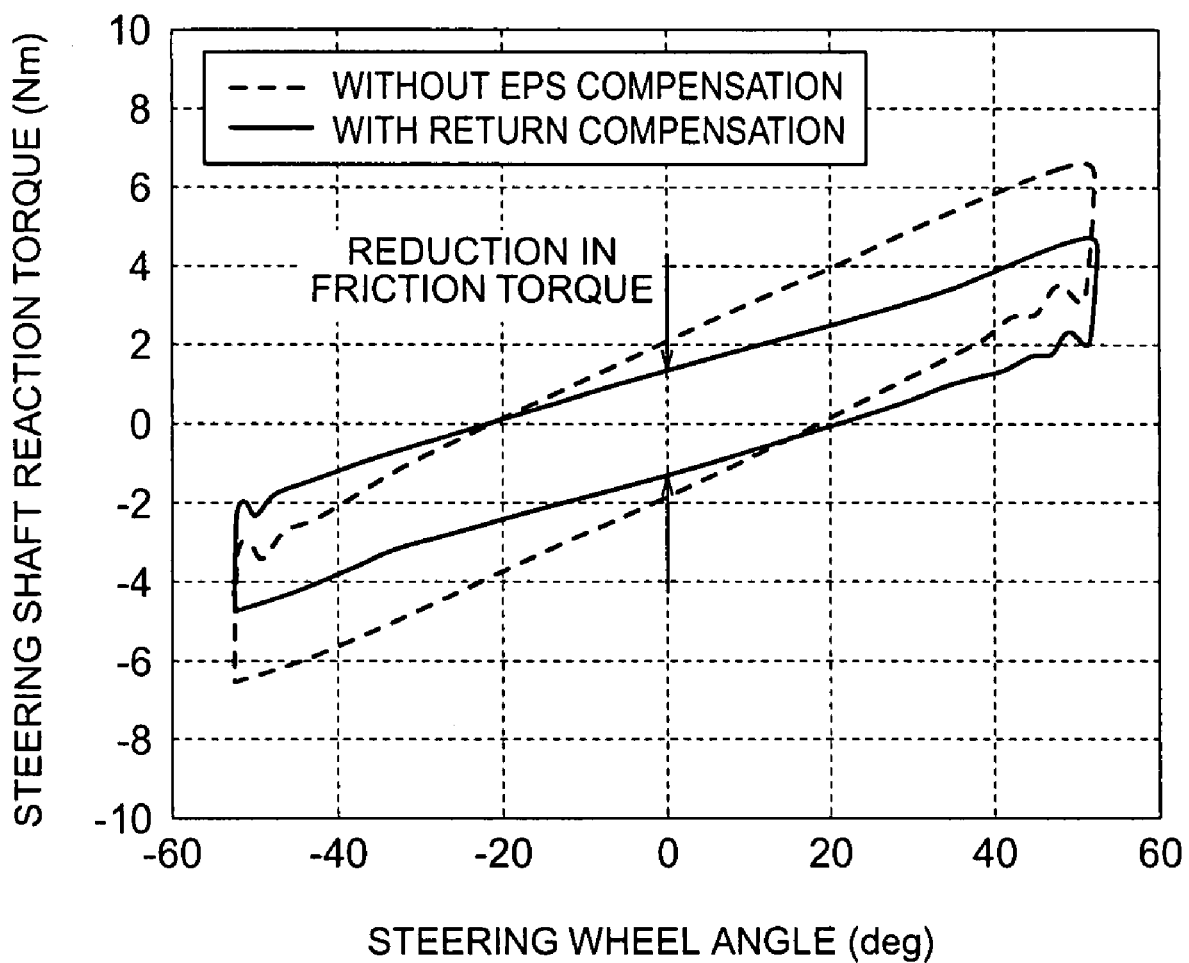
FIG. 8 is an explanatory diagram showing an effect resulting from a friction compensation torque shown in FIG. 4.

FIG. 8 is an explanatory diagram showing an effect resulting from the friction compensation torque fric(s). FIG. 8 illustrates Lissajous waveforms of the steering wheel angle θ and the steering shaft reaction torque Ttran in a case where the steering shaft reaction torque Ttran is compensated for only with the friction compensation torque fric(s).

Referring to FIG. 8, the gain k1 and the limiter fric_lim are set in the friction compensation portion 28, so the overall friction torque Tfric (i.e., hysteresis width) generated in the entire steering mechanism 1 can be reduced. Also, the gradient of the road surface reaction torque Talign is reduced, so the steering shaft reaction torque Ttran can be reduced.

Subsequently, the adder 29 adds the friction compensation torque fric(s) and the return compensation torque ret(s) together and outputs the assist torque Tassist(s) (step S56). The processings of FIG. 6 are thereby terminated.

Figure 9:
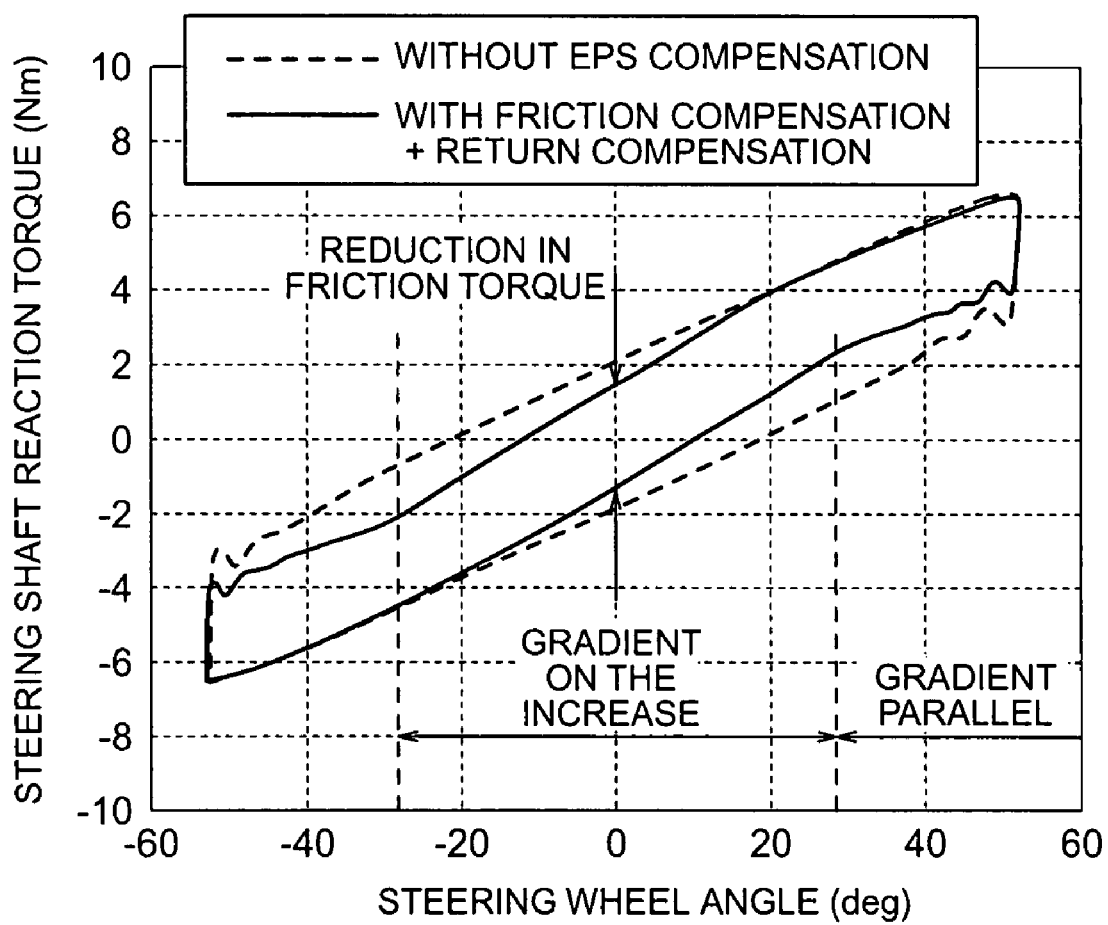
FIG. 9 is an explanatory diagram showing an effect resulting from the return compensation torque shown in FIG. 4 and the friction compensation torque shown in FIG. 4.

FIG. 9 is an explanatory diagram showing an effect resulting from the return compensation torque ret(s) and the friction compensation torque fric(s). FIG. 9 illustrates Lissajous waveforms of the steering wheel angle θ and the steering shaft reaction torque Ttran in a case where the steering shaft reaction torque Ttran is compensated for with the return compensation torque ret(s) and the friction compensation torque fric(s).

Referring to FIG. 9, the gains k2 and k1, and the limiters ret_lim and fric_lim are set in the return compensation portion 27 and the friction compensation portion 28, respectively, so the gradient of the road surface reaction torque Talign with respect to the steering wheel angle θ is increased to increase the steering shaft reaction torque Ttran. Also, the overall friction torque Tfric (i.e., hysteresis width) generated in the entire steering mechanism 1 is reduced. After the steering shaft reaction torque Ttran has reached the each limiter value, the gradient of the road surface reaction torque Talign can be held parallel to the gradient of no compensation.

A case where the gradient of the road surface reaction torque Talign with respect to the ideal steering wheel angle θ is small and the overall friction torque Tfric with respect to the ideal steering wheel angle θ is large has been described in the example of FIG. 9. However, the gradient of the road surface reaction torque Talign and the overall friction torque Tfric differ depending on the type of the vehicle.

However, even in a case where the characteristic of the vehicle is different, if the gains k1 and k2, and the limiters ret_lim and fric_lim are set as shown in FIG. 5, the ideal gradient of the road surface reaction torque Talign and the ideal overall friction torque Tfric (i.e., hysteresis width) can be obtained.

In the vehicular steering apparatus according to the first embodiment of the present invention, the assist torque determining portion 19 provided in the control means 10 outputs the assist torque signal Tassist(s) for causing the assist motor 7 to generate the assist torque Tassist based on the steering shaft reaction torque signal Ttran(s) and the road surface reaction torque Talign(s), and the motor current determining portion 20 outputs the target current value Imtr(t) for causing the assist motor 7 to generate the assist torque Tassist based on the assist torque signal Tassist(s) The overall friction torque Tfric generated in the entire steering mechanism 1 of the vehicle and the gradient of the road surface reaction torque Talign are thereby compensated for.

Therefore, a feeling of a road surface reaction force can be aroused in the driver, and the overall friction torque Tfric can be compensated for. As a result, a steering feeling can be constantly improved.

Even when the steering torque Thdl is 0 or the motor speed is 0, friction compensation can be carried out. Therefore, a steering feeling can be constantly improved in accordance with a driving state.

It is also possible to perform control in a case where the relationship between the steering torque Thdl and the lateral acceleration cannot be uniquely determined as in the case of a cant road or the like, or for a vehicle having no lateral acceleration detecting means. Also, the lateral acceleration detecting means is not required. Therefore, a reduction in cost can be achieved.

Second Embodiment

In the foregoing first embodiment of the present invention, the road surface reaction torque signal Talign(s) and the steering shaft reaction torque signal Ttran(s) have been described as signals obtained from the state quantity detector 12. However, the present invention is not limited to this configuration. That is, those signals may be obtained through calculation from various signals.

In a second embodiment of the present invention, components identical to those of the first embodiment of the present invention are denoted by the same reference symbols accompanied with "A" and will not be described in detail.

Figure 10:
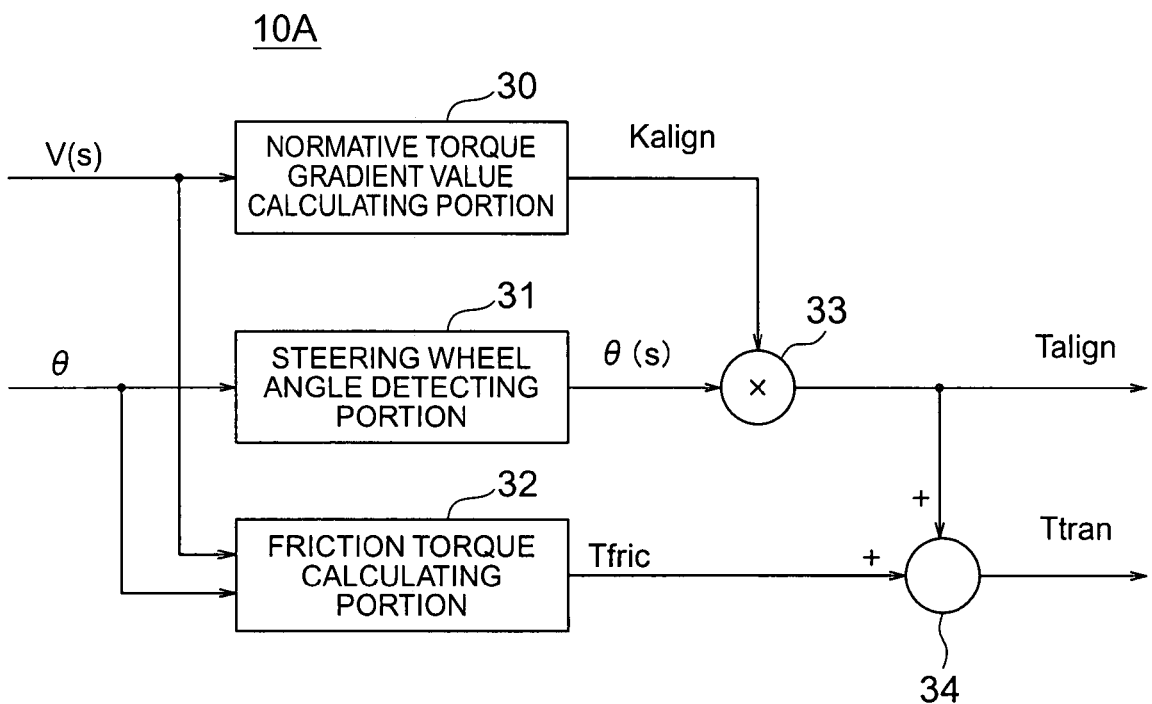
FIG. 10 is a functional block diagram showing an essential part of a control means according to a second embodiment of the present invention.

FIG. 10 is a functional block diagram showing an essential part of a control means 10A according to the second embodiment of the present invention.

Referring to FIG. 10, the control means 10A has a normative torque gradient value calculating portion 30, a steering wheel angle detecting portion 31, a friction torque calculating portion 32 (i.e., friction torque detecting means), a multiplier 33, and an adder 34. No output from the state quantity detector 12 shown in FIG. 1 is input to the control means 10A. A steering wheel angle θ is input to the control means 10A from the steering wheel angle detector 5.

Those respective blocks are provided at a stage preceding the road surface reaction torque detecting portion 15 and the steering shaft reaction torque detecting portion 16.

A gain Kalign corresponding to the vehicle speed signal V(s) output by the vehicle speed detecting portion 13 is stored in the normative torque gradient value calculating portion 30. The normative torque gradient value calculating portion 30 calculates the gain Kalign based on the input vehicle speed signal V(s).

The steering wheel angle detecting portion 31 receives the steering wheel angle θ output by the steering wheel angle detector 5, and outputs a steering wheel angle signal θ(s).

The multiplier 33 multiplies the gain Kalign and the steering wheel angle θ together to calculate the road surface reaction torque Talign. The road surface reaction torque Talign, which is calculated based on the steering wheel angle signal θ(s), is expressed in its simplest form by an equation (9) shown below.

$$T\text{align} = K\text{align} \cdot \theta \quad (9)$$

The overall friction torque Tfric generated in the entire steering mechanism 1, which corresponds to the vehicle speed signal V(s) output by the vehicle speed detecting portion 13, is stored in the friction torque calculating portion 32. The friction torque calculating portion 32 calculates the overall friction torque Tfric based on the input vehicle speed signal V(s) and the steering wheel angle θ output by the steering wheel angle detector 5. The overall friction torque Tfric is expressed by an equation (10) shown below.

$$T\text{fric} = f(V) \quad (10)$$

The adder 34 adds the road surface reaction torque Talign expressed by the equation (9) and the overall friction torque Tfric expressed by the equation (10) together to calculate the steering shaft reaction torque Ttran. The steering shaft reaction torque Ttran is expressed in the simplest form by an equation (11) shown below, which is derived from the equations (9) and (10).

The second embodiment of the present invention is identical to the first embodiment of the present invention in other configurational details, which therefore will not be described below.

$$T\text{tran} = K\text{align} \cdot \theta + f(V) \quad (11)$$

In general, the overall friction torque Tfric in the steering mechanism 1 is a constant value. However, a dither torque effect is produced due to vibrations resulting from rotation of the tires 9 when the vehicle speed V rises. The steering shaft reaction torque Ttran obtained from the equation (11) is a value obtained by compensating for a decrease in the overall friction torque Tfric (i.e., hysteresis width) with respect to the road surface reaction torque Talign, which results from the dither torque effect.

Figure 11:
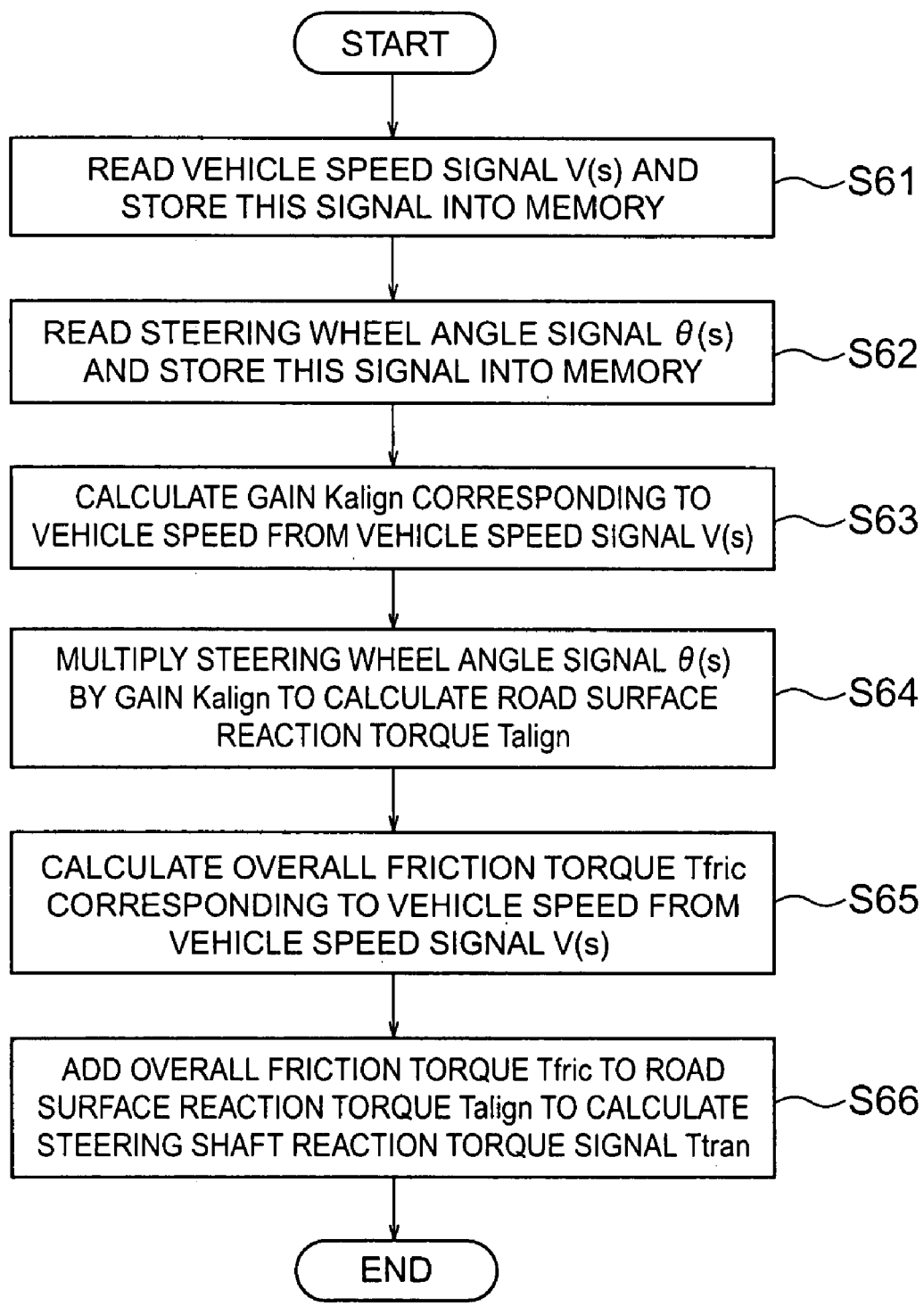
FIG. 11 is a flowchart showing an operation of a vehicular steering apparatus according to the second embodiment of the present invention.

The operation of the vehicular steering apparatus constructed as described above will be described with reference to a flowchart of FIG. 11.

The second embodiment of the present invention is characterized in that the road surface reaction torque Talign and the steering shaft reaction torque Ttran are calculated using the vehicle speed signal V(s) and the steering wheel angle θ.

Therefore, operations identical to those of the first embodiment of the present invention will not be described. Only the operations of calculating the road surface reaction torque Talign and the steering shaft reaction torque Ttran will be described.

First of all, the vehicle speed signal V(s) output by the vehicle speed detecting portion 13 is read and stored into the memory (step S61).

The steering wheel angle signal θ(s) output by the steering wheel angle detecting portion 31 is read and stored into the memory (step S62).

Subsequently, the normative torque gradient value calculating portion 30 calculates the gain Kalign based on the vehicle speed signal V(s) (step S63).

Then, the multiplier 33 multiplies the gain Kalign and the steering wheel angle θ together to calculate the road surface reaction torque Talign (step S64).

The friction torque calculating portion 32 calculates the overall friction torque Tfric based on the vehicle speed signal V(s) and the steering wheel angle θ (step S65).

Subsequently, the adder 34 adds the road surface reaction torque Talign and the overall friction torque Tfric together to calculate the steering shaft reaction torque Ttran (step S66), thereby terminating the processings of FIG. 11.

In the vehicular steering apparatus according to the second embodiment of the present invention, the road surface reaction torque Talign and the steering shaft reaction torque Ttran are calculated using the vehicle speed signal V(s) and the steering wheel angle θ. Therefore, compensation control corresponding to the steering wheel angle θ can be performed even in a region in which the road surface reaction torque Talign is not proportional to the steering wheel angle θ. Thus, a steering feeling can be constantly improved in accordance with a driving state.

In the foregoing first embodiment of the present invention, the steering shaft reaction torque Ttran and the road surface reaction torque Talign are detected by the state quantity detector 12. In the foregoing second embodiment of the present invention, the steering shaft reaction torque Ttran is calculated using the vehicle speed signal V(s) and the steering wheel angle θ. However, the present invention should not be limited to these calculations. That is, the calculations may also be made using the steering torque Thdl and the motor detected current Imtr, based on the equations (3) and (4).

The road surface reaction torque Talign may also be calculated using an estimation method disclosed in, for example, JP 2003-312521 A.

In these cases as well, effects similar to those of the foregoing first embodiment of the present invention and the foregoing second embodiment of the present invention can be achieved.

Third Embodiment

According to the description of the foregoing first embodiment of the present invention and the foregoing second embodiment of the present invention, all the steering wheel angles θ are subjected to friction compensation as shown in FIG. 8. However, the overall friction torque Tfric may be sufficiently compensated for with the assist map compensation torque map(s) output by the assist map compensation portion 24 in a region in which the road surface reaction torque Talign is large. In this region, therefore, there is a problem in that the assist map compensation portion 24 and the friction compensation portion 28 interfere with each other.

Thus, it is desirable to variably set the magnitude of the friction compensation torque fric(s) based on the magnitude of the road surface reaction torque Talign.

A processing of variably setting the friction compensation torque fric(s) using the road surface reaction torque Talign will be described hereinafter.

In a third embodiment of the present invention, components identical to those of the first embodiment of the present invention are denoted by the same reference symbols accompanied with "A" and will not be described in detail.

Figure 12:
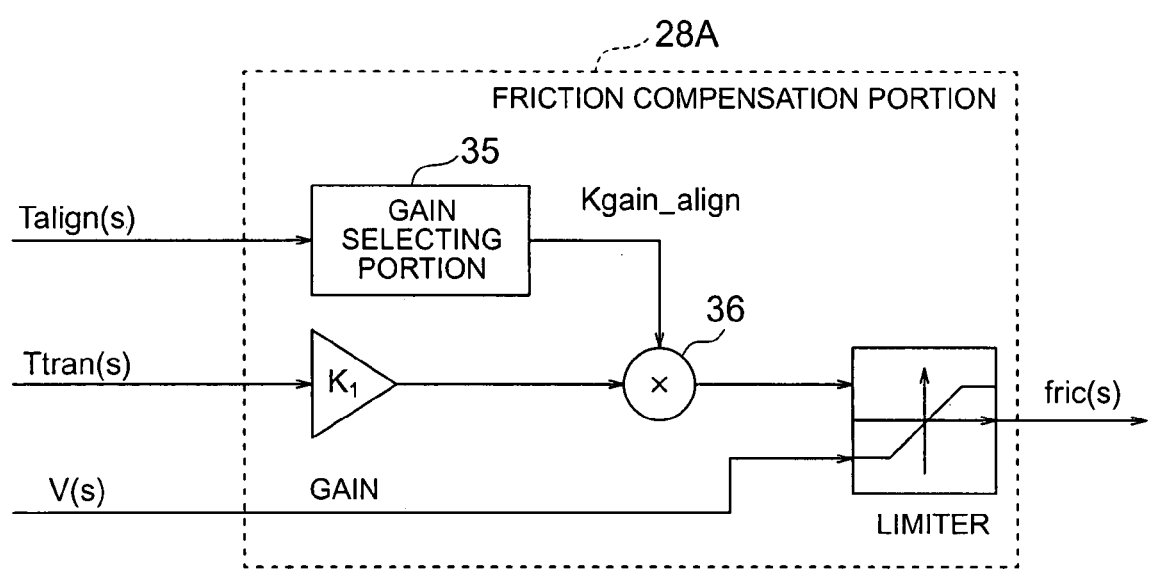
FIG. 12 is a block diagram showing in detail a friction compensation portion provided in an assist torque determining portion of a vehicular steering apparatus according to a third embodiment of the present invention.

FIG. 12 is a block diagram showing in detail a friction compensation portion 28A provided in the assist torque determining portion 19 of a vehicular steering apparatus according to the third embodiment of the present invention.

Referring to FIG. 12, the friction compensation portion 28A has a gain selecting portion 35 and a multiplier 36. The road surface reaction torque signal Talign(s), the steering shaft reaction torque signal Ttran(s), and the vehicle speed signal V(s) are input to the friction compensation portion 28A. As is the case with the first embodiment of the present invention and the second embodiment of the present invention, the gain k1 and the limiter fric_lim are set in the friction compensation portion 28A.

A gain Kgain_align corresponding to the road surface reaction torque Talign is stored in the gain selecting portion 35. The gain Kgain_align output by the gain selecting portion 35 decreases as the input road surface reaction torque Talign increases.

The multiplier 36 multiplies together the steering shaft reaction torque signal Ttran(s), which has been amplified with the gain k1, and the gain Kgain_align.

The third embodiment of the present invention is identical to the first embodiment of the present invention in other configurational details, which therefore will not be described below.

Figure 13:
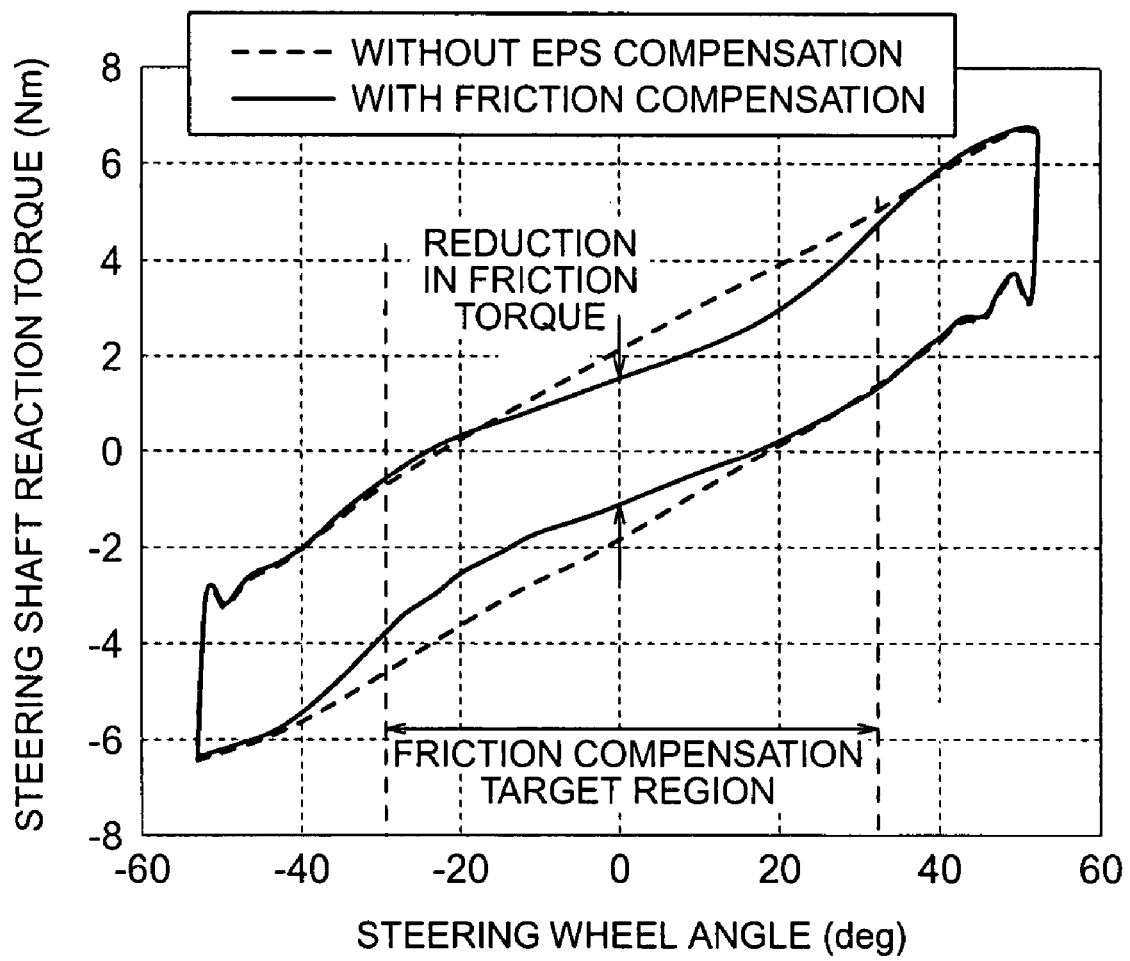
FIG. 13 is an explanatory diagram showing Lissajous waveforms of a steering wheel angle θ and a steering shaft reaction torque in a case where the steering shaft reaction torque is compensated for with only a friction compensation torque output from the friction compensation portion shown in FIG. 12.

FIG. 13 is an explanatory diagram showing Lissajous waveforms of the steering wheel angle θ and the steering shaft reaction torque Ttran in a case where the steering shaft reaction torque Ttran is compensated for with only the friction compensation torque fric(s) output by the friction compensation portion 28A shown in FIG. 12.

Referring to FIG. 13, the steering shaft reaction torque Ttran is compensated for with the friction compensation torque fric(s) output by the friction compensation portion 28A, so the overall friction torque Tfric (i.e., hysteresis width) generated in the entire steering mechanism 1 can be reduced in a region (i.e., friction compensation target region) in which the overall friction torque Tfric is not compensated for with the assist map compensation torque map(s).

In the vehicular steering apparatus according to the third embodiment of the present invention, the friction compensation portion 28A, which has the gain selecting portion 35 and the multiplier 36, variably sets the magnitude of the friction compensation torque fric(s) in accordance with the magnitude of the road surface reaction torque Talign.

Therefore, the friction compensation torque fric(s) is set small in a case where the road surface reaction torque Talign is large and the overall friction torque Tfric is sufficiently compensated for with the assist map compensation torque map(s). As a result, the assist map compensation portion 24 and the friction compensation portion 28A can be prevented from interfering with each other.

What is claimed is:

1. A vehicular steering apparatus, comprising:
   a motor for generating an assist torque for supplementing a steering torque exerted by a driver of a vehicle;
   steering shaft reaction torque detecting means for detecting a steering shaft reaction torque generated on a steering shaft of the vehicle and having hysteresis characteristics;
   road surface reaction torque detecting means for detecting a road surface reaction torque received by wheels of the vehicle from a road surface; and
   target current calculating means for calculating a target current value for driving the motor, wherein:
   the target current calculating means includes first compensation means for calculating a first compensation amount for compensating for the assist torque based on the steering shaft reaction torque, and second compensation means for calculating a second compensation amount for compensating for the assist torque based on the road surface reaction torque; and
   the target current calculating means uses the first and second compensation amounts to calculate the target current to compensate for an overall friction torque generated in an entire steering mechanism of the vehicle and a gradient of the road surface reaction torque,
   wherein the first compensation amount is a friction compensation torque, which acts in a steering direction of a driver and which is calculated based on the steering shaft reaction torque and a speed of the vehicle; and
   wherein the second compensation amount is a return compensation torque, which acts in a direction opposite the steering direction of the driver and which is calculated based on the road surface reaction torque and the vehicle speed.

2. A vehicular steering apparatus according to claim 1, wherein the road surface reaction torque is obtained by subtracting the overall friction torque from the steering shaft reaction torque.

3. A vehicular steering apparatus according to claim 1, wherein:
   the steering shaft reaction torque detecting means comprises steering torque detecting means for detecting the steering torque, and motor current detecting means for detecting a motor current flowing through the motor; and
   the steering shaft reaction torque is calculated based on the steering torque and the motor current.

4. A vehicular steering apparatus according to claim 1, wherein:
   the steering shaft reaction torque detecting means comprises steering wheel angle detecting means for detecting a steering wheel angle of a steering wheel of the vehicle, vehicle speed detecting means for detecting a vehicle speed of the vehicle, and friction torque detecting means for detecting the overall friction torque generated in the entire steering mechanism of the vehicle; and
   the steering shaft reaction torque is calculated based on the steering wheel angle, the vehicle speed, and the overall friction torque.

5. A vehicular steering apparatus according to claim 1, wherein:
   the road surface reaction torque detecting means comprises steering wheel angle detecting means for detecting a steering wheel angle of a steering wheel of the vehicle and vehicle speed detecting means for detecting a vehicle speed of the vehicle; and
   the road surface reaction torque is calculated based on the steering wheel angle and the vehicle speed.

6. A vehicular steering apparatus according to claim 1, wherein the first compensation amount is smaller than the overall friction torque.

7. A vehicular steering apparatus according to claim 1, further comprising vehicle speed detecting means for detecting a vehicle speed of the vehicle, wherein
   the first compensation amount has an upper limit and a lower limit that are variably set based on the vehicle speed.

8. A vehicular steering apparatus according to claim 1, wherein the first compensation amount is variably set based on the road surface reaction torque.

9. A vehicular steering apparatus according to claim 1, wherein the first compensation amount and the second compensation amount are calculated using gains that are variably set according to a type of the vehicle.

10. A vehicular steering apparatus according to claim 1, wherein the first compensation amount and the second compensation amount are calculated using limiter values that are variably set according to a type of the vehicle.

11. A vehicular steering apparatus according to claim 9, wherein the first compensation amount and the second compensation amount are calculated using limiter values that are variably set according to a type of the vehicle, and
    wherein a gain for the first compensation amount is set to be less than a gain for the second compensation amount, and a limiter value for the first compensation amount is set to be less than a limiter value for the second compensation amount when the overall friction torque is equal to an ideal overall friction torque, and the gradient of road surface reaction torque is less than an ideal gradient of road surface reaction torque.

12. A vehicular steering apparatus according to claim 9, wherein the first compensation amount and the second compensation amount are calculated using limiter values that are variably set according to a type of the vehicle, and
    wherein a gain for the first compensation amount is set to be greater than a gain for the second compensation amount, and a limiter value for the first compensation amount is set to be greater than or equal to a limiter value for the second compensation amount when the overall friction torque is equal to an ideal overall friction torque, and the gradient of road surface reaction torque is greater than an ideal gradient of road surface reaction torque.

13. A vehicular steering apparatus according to claim 9, wherein the first compensation amount and the second compensation amount are calculated using limiter values that are variably set according to a type of the vehicle, and
    wherein a gain for the first compensation amount is set to be less than a gain for the second compensation amount, and a limiter value for the first compensation amount is set to be less than or equal to a limiter value for the second compensation amount when the overall friction torque is greater than an ideal overall friction torque, and the gradient of road surface reaction torque is less than an ideal gradient of road surface reaction torque.

14. A vehicular steering apparatus according to claim 9, wherein the first compensation amount and the second compensation amount are calculated using limiter values that are variably set according to a type of the vehicle, and wherein a gain for the first compensation amount is set to be equal to a gain for the second compensation amount, and a limiter value for the first compensation amount is set to be greater than or equal to a limiter value for the second compensation amount when the overall friction torque is greater than an ideal overall friction torque, and the gradient of road surface reaction torque is equal an ideal gradient of road surface reaction torque.

15. A vehicular steering apparatus according to claim 9, wherein the first compensation amount and the second compensation amount are calculated using limiter values that are variably set according to a type of the vehicle, and wherein a gain for the first compensation amount is set to be greater than a gain for the second compensation amount, and a limiter value for the first compensation amount is set to be greater than or equal to a limiter value for the second compensation amount when the overall friction torque is greater than an ideal overall friction torque, and the gradient of road surface reaction torque is greater than an ideal gradient of road surface reaction torque.

* * * * *